Aug. 13, 1957     K. H. MUELLER     2,802,273
DIAL INDICATOR HOLE GAGE
Filed July 26, 1954
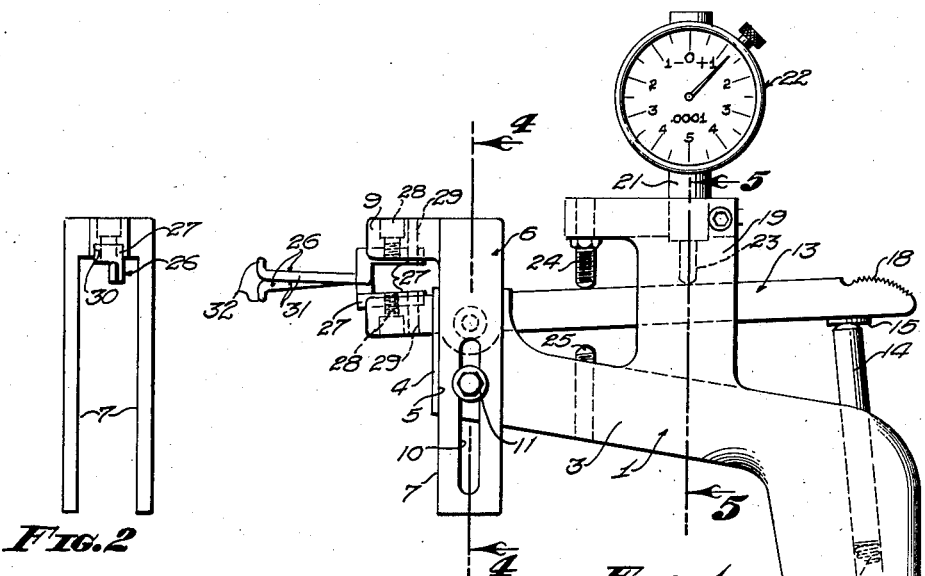
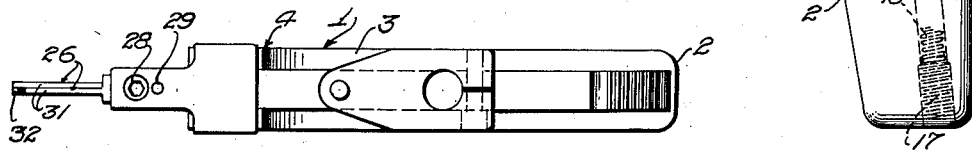
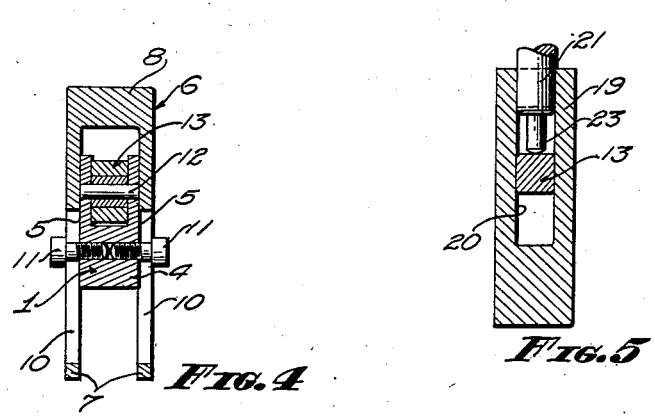
INVENTOR.
KURT H. MUELLER
BY
ATTORNEYS

United States Patent Office 2,802,273
Patented Aug. 13, 1957

2,802,273

DIAL INDICATOR HOLE GAGE

Kurt H. Mueller, Monrovia, Calif.

Application July 26, 1954, Serial No. 445,605

4 Claims. (Cl. 33—148)

My invention relates to dial indicator hole gages, and included in the objects of my invention are:

Frist, to provide a device of this class which carries a dial indicator and probing means insertable into a recess or bore to measure the diameter thereof or the diameter of internal channels formed therein.

Second, to provide a device of this class which is particularly easy to manipulate, and without great skill on the part of the user can be depended upon to give consistent readings to close tolerances.

Third to provide a device of this class which may be readily and quickly adjusted to measure holes of various diameters.

Fourth, to provide a device of this class which may be equipped with a set of interchangeable probe elements for special measurement requirements.

With the above and other objects in view, as may appear hereinafter, reference is directed to the accompanying drawings, in which:

Figure 1 is a side view of my dial indicator hole gage;

Fig. 2 is an end view of the probe supporting saddle member;

Fig. 3 is a top or plan view of the hole gage with the dial indicator removed;

Fig. 4 is a transverse sectional view through 4—4 of Fig. 1; and

Fig. 5 is a transverse sectional view through 5—5 of Fig. 1 with the dial indicator shown fragmentarily.

My dial indicator hole gage includes a body member 1 having a pistol grip handle 2 and an arm 3 extending forwardly and upwardly therefrom. The arm 3 terminates in a head 4 having vertical guide slots 5 on opposite sides.

A U-shaped saddle member 6 having legs 7 is disposed with its legs in the vertical guides 5 and its cross portion 8 disposed above the head 4. The cross portion 8 is provided with a horizontally extending probe support 9. Vertical slots 10 are formed in the legs 7 and receive lock screws 11 which screw thread into the head 4 so that the vertical position of the saddle member 6 may be adjusted and secured.

The upper portion of the head 4 is slotted and provided with a journal pin 12 on which is pivotally mounted a lever 13, which extends forwardly under the probe support 10 and rearwardly to a point over the handle 2. The handle is provided with an upwardly directed bore which receives a plunger 14. The plunger protrudes from the upper end of the handle 2 and engages a button 15 under the lever 13 so as to urge this end of the lever away from the handle 2. The plunger 14 is backed by a spring 16 within the handle 2. The force of the spring may be adjusted by a tension nut 17, accessible from the lower end of the handle.

The rear extremity of the lever 13 above the handle 2 is provided with a knurled portion 18 for engagement by one's thumb when the pistol grip handle is engaged by the palm and fingers of the hand.

Extending upwardly from the arm 3, forwardly of the handle 2, is a pedestal 19 which is provided with a slot 20 to accommodate the lever 13. The upper portion of the pedestal which overlies the lever 13 is provided with a vertical bore which receives a stem 21 of a dial indicator 22. The dial indicator may be conventional. A set screw is provided for securing the stem. Protruding from the stem 21 is a plunger 23 which bears against the lever 13. The pedestal 19 is provided with a forwardly projecting portion from which depends a stop screw 24, and an opposing stop screw 25 extends upwardly from the arm 3. The stop screws limit pivotal movement of the lever 13.

The probe support 9 and the forwardly projecting portion of the lever 13 are provided with a pair of cooperating probe members 26. These members may take various forms, depending upon the nature, size, and location of the hole, recess, or channel to be measured, and are preferably identical in construction unless the nature of the measurement to be made dictates otherwise. Each probe member 26 includes a mounting end 27 which is secured to the lever or the probe support, as the case may be, by a screw 28 and a locating pin 29. In addition, the probe support 9 and lever 13 each is provided, preferably, with a longitudinal channel 30 to accommodate the mounting end 27 so that the probe members may be located with accuracy.

Each probe member 26 is provided with a stem 31 which, for the measurement of small diameter holes, extends in offset relation from the mounting end 27. Also these members are offset laterally so that they may lie side by side, as shown in Figs. 1 and 3. The stems 31 terminate in tips 32 which, in the embodiment illustrated, extend in opposite directions.

The particular probe members illustrated are intended primarily for measuring the diameter of a hole or the diameter of a small channel located within a hole or recess. However, numerous other types and configurations of probe members are employed to meet special measurement problems.

In the construction illustrated, the tips 32 of the probe members 26 are located exactly the same distance from the fulcrum axis of the lever 13 as the point of contact of the plunger 23 with the lever, so that the reading of the dial indicator will correspond to the movement of the probe tips. This is not necessary in all cases, however. For example, the probe tips may be extended so that the distance is twice the distance between the fulcrum and dial indicator plunger. Also in many instances the relative distances between the probe tips and fulcrum and dial indicator plunger and fulcrum are not critical, particularly when the instrument is used to measure tolerances from an ideal mean distance. In Fig. 1, an indicator arranged for such purpose is shown.

Operation of my dial indicator hole gage is as follows:

The operator grasps the pistol grip between the palm and fingers, placing his thumb on the knurled extremity of the lever 13, and depressing the lever. This reduces the distance between the tips 32 so that the probe members may be inserted in a hole. After insertion, the thumb is removed from the lever so that the spring 16 urges the tips 32 against diametrically opposite sides of the hold or channel to be measured. The dial indicator is then read.

The amount of movement of the tips 32 is relatively limited, therefore gross adjustment is effected by adjusting the position of the saddle member 6. It should also be observed that the conventional dial indicator is adjustable so as to bring the pointer to a zero reading for any selected reference distance between the tips 32, so that a tolerance reading may be readily obtained.

Having fully described my invention, it is to be under-

I claim:

1. A gage structure, comprising: a body member having a handle, an angularly extending arm, and guides at the extremity of said arm on opposite sides thereof and in substantial parallelism with said handle; a lever pivotally connected to said body member between said guides and extending therefrom over said handle and having a manual engageable end; a saddle member adjustable in said guides and overlying said lever; probes removably attached to said lever and saddle and extending forwardly thereof; and a dial indicator disposed in fixed relation to said arm and having a sensing tip engageable with said lever to indicate relative displacement of said probe elements.

2. A gage structure, comprising: a body member having a handle, an angularly extending arm and guides at the extremity of said arm at opposite sides thereof and in substantial parallelism with said handle, and a pedestal extending upwardly from said arm; a lever pivotally connected to said body member between said guides and extending therefrom over said arm and handle through said pedestal, there being an accommodation slot therein; a saddle member adjustable in said guides and overlying said lever; probes removably attached to said lever and saddle and extending forwardly thereof; and a dial indicator secured to said pedestal and having a sensing tip engageable with said lever to indicate relative displacement of said probe elements.

3. A gage structure, comprising: a body member having a handle, an angularly extending arm, and guides at the extremity of said arm on opposite sides thereof and in substantial parallelism with said handle; a lever pivotally connected to said body member between said guides and extending therefrom over said handle and having a manual engageable end; a spring and plunger means in said handle engageable with said lever to urge the manually engageable end thereof away from said handle; a saddle member adjustable in said guides and overlying said lever; probes removably attached to said lever and saddle and extending forwardly thereof; and a dial indicator disposed in fixed relation to said arm and having a sensing tip engageable with said lever to indicate relative displacement of said probe elements.

4. A gage structure, comprising: a body member having a handle, an angularly extending arm and guides at the extremity of said arm at opposite sides thereof and in substantial parallelism with said handle, and a pedestal extending upwardly from said arm; a lever pivotally connected to said body member between said guides and extending therefrom over said arm and handle through said pedestal, there being an accommodation slot therein; a spring and plunger means in said handle engageable with said lever to urge the manually engageable end thereof away from said handle; a saddle member adjustable in said guides and overlying said lever; probes removably attached to said lever and saddle and extending forwardly thereof; and a dial indicator secured to said pedestal and having a sensing tip engageable with said lever to indicate relative displacement of said probe elements.

References Cited in the file of this patent

UNITED STATES PATENTS

| | | |
|---|---|---|
| 1,593,753 | Darlington | July 27, 1926 |
| 1,950,912 | Aronson | Mar. 13, 1934 |
| 1,990,138 | Schuster | Feb. 5, 1935 |
| 2,337,509 | Todd | Dec. 21, 1943 |

FOREIGN PATENTS

| | | |
|---|---|---|
| 420,998 | Italy | May 12, 1947 |
| 426,285 | Italy | Oct. 23, 1947 |
| 896,117 | Germany | Nov. 9, 1953 |